United States Patent
Spitaels et al.

(10) Patent No.: US 7,099,784 B2
(45) Date of Patent: Aug. 29, 2006

(54) METHOD AND APPARATUS FOR PREVENTING OVERLOADS OF POWER DISTRIBUTION NETWORKS

(75) Inventors: James Spitaels, Worcester, MA (US); Neil Rasmussen, Concord, MA (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 10/788,200

(22) Filed: Feb. 26, 2004

(65) Prior Publication Data

US 2004/0167732 A1 Aug. 26, 2004

Related U.S. Application Data

(63) Continuation of application No. 10/038,701, filed on Jan. 2, 2002, now Pat. No. 6,721,672.

(51) Int. Cl.
*G06F 19/00* (2006.01)
*G06F 1/32* (2006.01)

(52) U.S. Cl. .................... 702/57; 702/60; 702/132; 713/300; 713/310; 713/320; 713/340

(58) Field of Classification Search ............ 702/62, 702/60, 61, 132; 307/31, 32, 34, 35, 39; 713/300, 310, 320, 324, 340; 700/295, 297
See application file for complete search history.

(56) References Cited

U.S. PATENT DOCUMENTS

| | | | | |
|---|---|---|---|---|
| 4,611,289 A | | 9/1986 | Coppola | |
| 5,017,799 A | * | 5/1991 | Fishman | 307/34 |
| 5,355,083 A | * | 10/1994 | George et al. | 324/229 |
| 5,450,334 A | | 9/1995 | Pulizzi et al. | |
| 5,534,734 A | | 7/1996 | Pugh et al. | |
| 5,541,510 A | * | 7/1996 | Danielson | 324/233 |
| 5,543,667 A | * | 8/1996 | Shavit et al. | 307/39 |
| 5,675,503 A | * | 10/1997 | Moe et al. | 700/296 |
| 5,734,711 A | * | 3/1998 | Kleffner | 379/323 |
| 5,784,628 A | | 7/1998 | Reneris | |
| 5,919,263 A | * | 7/1999 | Kikinis et al. | 713/320 |
| 5,949,974 A | | 9/1999 | Ewing et al. | |
| 6,219,795 B1 | | 4/2001 | Klein | |
| 6,351,534 B1 | * | 2/2002 | Phillips | 379/413 |
| 6,445,088 B1 | | 9/2002 | Spitaels et al. | |
| 6,608,528 B1 | * | 8/2003 | Tam et al. | 331/2 |
| 6,721,672 B1 | * | 4/2004 | Spitaels et al. | 702/62 |
| 6,788,156 B1 | * | 9/2004 | Tam et al. | 331/49 |
| 6,795,928 B1 | * | 9/2004 | Bradley et al. | 713/320 |
| 6,829,713 B1 | * | 12/2004 | Cooper et al. | 713/320 |
| 6,859,882 B1 | * | 2/2005 | Fung | 713/300 |
| 6,904,534 B1 | * | 6/2005 | Koenen | 713/323 |

(Continued)

OTHER PUBLICATIONS

International Search Report mailed Jun. 30, 2003.

(Continued)

*Primary Examiner*—Patrick J. Assouad
(74) *Attorney, Agent, or Firm*—Lowrie, Lando & Anastasi, LLP

(57) ABSTRACT

Systems and methods for monitoring power in power distribution systems are provided. In one aspect, a system for monitoring power includes a power monitoring device that measures a value of at least one characteristic of power provided to a branch of a power distribution system. The power monitoring device includes an output that provides the value measured. The system further includes a controller having an input to receive the value measured and an output that couples to a first device powered by the branch to send a maximum power signal to the first device to command the first device to operate at a percentage of maximum power.

20 Claims, 6 Drawing Sheets

U.S. PATENT DOCUMENTS

| | | | |
|---|---|---|---|
| 6,925,573 B1* | 8/2005 | Bodas | 713/320 |
| 6,964,539 B1* | 11/2005 | Bradley et al. | 403/300 |
| 7,032,119 B1* | 4/2006 | Fung | 713/320 |
| 7,035,972 B1* | 4/2006 | Guha et al. | 711/114 |
| 2001/0003206 A1 | 6/2001 | Pole, II et al. | |
| 2002/0004912 A1* | 1/2002 | Fung | 713/300 |
| 2002/0004913 A1* | 1/2002 | Fung | 713/300 |
| 2002/0004915 A1* | 1/2002 | Fung | 713/320 |
| 2002/0007463 A1* | 1/2002 | Fung | 713/320 |
| 2002/0007464 A1* | 1/2002 | Fung | 713/320 |
| 2002/0024332 A1 | 2/2002 | Gardner | |
| 2002/0038434 A1* | 3/2002 | Ando | 713/500 |
| 2002/0062454 A1* | 5/2002 | Fung | 713/300 |
| 2002/0116139 A1 | 8/2002 | Przydatek et al. | |
| 2002/0133728 A1 | 9/2002 | Agarwal | |
| 2002/0162032 A1* | 10/2002 | Gundersen et al. | 713/300 |
| 2002/0178387 A1 | 11/2002 | Theron | |
| 2002/0194517 A1* | 12/2002 | Cohen et al. | 713/340 |
| 2003/0005339 A1 | 1/2003 | Cohen et al. | |
| 2003/0009705 A1 | 1/2003 | Thelander et al. | |
| 2003/0076183 A1* | 4/2003 | Tam et al. | 331/100 |
| 2003/0084357 A1* | 5/2003 | Bresniker et al. | 713/320 |
| 2003/0084358 A1* | 5/2003 | Bresniker et al. | 713/324 |
| 2003/0084359 A1* | 5/2003 | Bresniker et al. | 713/324 |
| 2003/0114963 A1* | 6/2003 | Walker | 700/291 |
| 2003/0120959 A1* | 6/2003 | Bohrer et al. | 713/320 |
| 2003/0188208 A1* | 10/2003 | Fung | 713/320 |
| 2003/0196126 A1* | 10/2003 | Fung | 713/300 |
| 2003/0200473 A1* | 10/2003 | Fung | 713/320 |
| 2003/0201838 A1* | 10/2003 | Tam et al. | 331/74 |
| 2004/0163001 A1* | 8/2004 | Bodas | 713/300 |
| 2004/0228087 A1* | 11/2004 | Coglitore | 361/687 |
| 2005/0071699 A1* | 3/2005 | Hammond et al. | 713/300 |
| 2005/0108582 A1* | 5/2005 | Fung | 713/300 |
| 2005/0177755 A1* | 8/2005 | Fung | 713/300 |

OTHER PUBLICATIONS

Cpuldle for Windows 95/98 Documentation, downloaded Jul. 2, 2001.

* cited by examiner

METHOD AND APPARATUS FOR PREVENTING OVERLOADS OF POWER DISTRIBUTION NETWORKS

RELATED APPLICATIONS

This application is a continuation of U.S. patent application Ser. No. 10/038,701, filed on Jan. 2, 2002 now U.S. Pat No. 6,721,672, which is incorporated herein by reference.

FIELD OF THE INVENTION

The present invention relates generally to methods and apparatus for measuring current or power delivered to loads in power distribution networks, and more specifically, to methods and apparatus for preventing overload conditions in power distribution equipment used to power equipment having variable input power requirements.

BACKGROUND OF THE INVENTION

The proliferation of the Internet has created a need for large scale data centers that contain tens, if not hundreds, of racks of computing equipment, such as servers and routers. One of the major problems confronted by designers of these data centers is the requirement to route facility power to each of these racks of equipment. Typically, branch circuits from a primary or a secondary distribution panel are routed to groups of racks to provide power to the equipment in the rack. Each of the branch circuits is designed to provide a predetermined maximum power level or current, and the size of cabling used to route the power for a branch, and the size of circuit breakers used for the branch are selected based on this predetermined maximum power level or, more typically, predetermined maximum current.

Typically, it is desirable to design each of the branch circuits such that the total current drawn by the equipment coupled to any given one of the branch circuits is at some predetermined percentage (for example 50%) of the maximum current level for that branch circuit. This allows some flexibility to add additional equipment to racks and provides a safety margin below the maximum current level.

To properly design the routing of the branch circuits, it is desirable to know, with some accuracy, the current that is drawn by the equipment in the racks. Traditionally, the power or current drawn by computer equipment could be determined based on manufacturers' specifications and/or by making actual measurements of the current being drawn by the equipment.

These measurements and specifications are only useful for equipment for which the current draw is substantially static, which in the past was true for typical computing equipment. However, for newer computing equipment, the current draw is typically not static due to a number of factors including: 1) many computers utilize some form of power management strategy which minimizes the power (and current) consumption of the computer by turning off or slowing down subsystems within the computer when they are not in use; 2) cooling systems (i.e., fans) are often speed controlled based on air and component temperatures to reduce power consumption and acoustic noise generation; and 3) the amount of power drawn by the processors and memory systems in computers has increased steadily with the increase of speed of the processors, so that the power consumed by the processors and memory subsystems may exceed 50% of the total power draw of a computer. The power drawn by processors and memory systems is variable depending on the processing load, and since the total power of these systems may be a significant portion of the total power, the total power draw of a computer can vary significantly depending on the processing load on the computer.

The operating systems of most computers are capable of simultaneously performing multiple tasks by assigning segments of the CPU processing time to each of the tasks on a priority basis. Any remaining segments of the CPU processing time are occupied by an idle task in which the CPU can be halted and all associated clocks can be stopped to reduce the power draw of the computer. Further, some computers, for example, those that utilize the Windows® 98 or Windows® 2000 operating system, have an Advanced Control and Power Interface (ACPI) feature that allows the operating system to control power to fans and other devices in the computer to further reduce the power drawn by the computer. Because of the factors described above, it is not unusual for a more modern system to consume twice as much power when the processors are fully computationally loaded and operating in a warm environment, then when computationally idle and operating in a cool environment.

The variability of the power draw of computers complicates the electrical design of data centers. Computer manufacturers typically provide power ratings on nameplates. These nameplate values are typically maximum values that are determined based on the maximum power that a computer may draw when fully loaded with all options and with all subsystems operating at full load. Because of conservative approaches taken in determining nameplate values, they are often greater than even worst case values for a given computer, and accordingly are of little use to an electrical facility designer. While a designer may measure the current drawn by a computer or a set of computers to determine the power draw, it is typically not known at the measurement time, whether the computer is at full load or at what percentage of full load the computer is operating.

Several problems may occur when circuit branches are designed based on measured power draw values of computers. First, the wiring used in power routing circuits may be undersized for full load conditions, and second, when one or more of the computers powered from a branch are operated at full load, the current drawn may exceed the circuit breaker value for the branch, causing the circuit breaker to trip and disconnect power to the computers. For critical applications of computers, any such power interruption is often unacceptable. Further, to prevent power interruptions to critical computers, it is common to use uninterruptible power supplies (UPSs) for these computers. Often, one UPS is used to power multiple computers or racks of computers. To properly size the UPS, it is necessary to know the power draw of each of the computers and other equipment powered by the UPS. The variability of the power draw in newer computers makes it difficult to properly size a UPS for these applications.

SUMMARY OF THE INVENTION

Embodiments of the present invention provide improved systems and methods for measuring the current or power draw of computers and racks of equipment that overcome problems described above.

A first aspect of the present invention is directed to a system for monitoring power in a power distribution system. The system includes a power monitoring device located in the power distribution system to measure a value of at least one characteristic of power provided to a branch of the power distribution system, the power monitoring device having an output that provides the value measured, and a controller having an input to receive the value measured and an output that couples to a first device powered by the branch of the power distribution system to send a power signal to the first device to command the first device to operate at a predetermined percentage of maximum power.

The system for monitoring power can further include a plurality of power monitoring devices, each located in the power distribution system to measure at least one characteristic of power provided to a respective branch of the power distribution system, and each having an output to couple to the controller to provide a value of the characteristic measured. Each of the respective branches of the power distribution system can provide power to at least one respective device, and the controller can be adapted to send a power signal to each respective device to command each device to operate at the predetermined percentage of maximum power. The controller can be adapted to send the power signal to devices powered by one branch at a same time, to cause each of the devices on the one branch to operate at the predetermined percentage of maximum power. The controller can be adapted to total the values measured for each of a plurality of branch circuits and compare the total with a first overload value to detect an overload condition. The controller can be adapted to send an alarm signal to an operator upon detection of an overload condition. The controller can be adapted to send a signal to disconnect power to one or more devices upon detection of an overload condition. The at least one characteristic can be electrical current.

The controller of the power monitoring system can further include a first network interface to communicate with devices powered by the power distribution system over a first communications network and a second network interface to communicate over a second communications network. Each of the plurality of power monitoring devices can include a network interface to communicate with the controller over the second communications network. The power distribution system can include an uninterruptible power supply, and the controller can be adapted to communicate with the uninterruptible power supply to detect that the uninterruptible power supply is operating on battery mode and replace the first overload value with a second overload value. The controller can be adapted to send a signal to interrupt power to at least one device upon detection that the uninterruptible power supply is operating on battery mode. The system can further include a plurality of temperature sensors that monitor temperature at locations within a facility, each of the temperature sensors having an output to communicate a temperature value to the controller. The controller can be adapted to compare temperature values received from the temperature sensors with predetermined values to detect an over temperature error condition, and upon detection of an over temperature error condition send an alarm signal. The controller can be adapted to send a signal to interrupt power to at least one device upon detection of an over temperature error condition. The predetermined percentage of maximum power can be 100 percent.

Another aspect of the present invention is directed to a method for monitoring and controlling a power distribution system that has a plurality of circuit branches for providing power to a plurality of devices. The method includes controlling a first device on a first circuit branch to operate at a predetermined percentage of maximum power, detecting a first value for a characteristic of power provided to the first circuit branch, controlling a second device on a second circuit branch to operate at a predetermined percentage of maximum power, detecting a second value for a characteristic of power provided to the second circuit branch, adding the first value to the second value to obtain a total value, comparing the total value to an overload value to detect an overload condition, and indicating an alarm condition when the total value exceeds the overload value.

The first device can be controlled to operate at less than the predetermined percentage of maximum power when the second device is controlled to operate at the predetermined percentage of maximum power. The method can further include controlling one of the plurality of devices to operate in a reduced power mode upon detection of an overload condition. The method can further include interrupting power to one of the plurality of devices upon detection of an overload condition. The characteristic measured can be electrical current. The method can further include communicating with the first device and the second device over a first communications network, and communicating with power detection devices over a second communications network. The power distribution system can further include an uninterruptible power supply, and the method can further include detecting when the uninterruptible power supply is operating in a battery mode, and controlling at least one of the plurality of devices to operate in a reduced power mode upon detection of the battery mode. The method can further include interrupting power to at least one of the plurality of devices upon detection of the battery mode. The power distribution system can be at least partially contained within a facility, and the method can further include measuring air temperature at a plurality of locations within the facility, comparing at least one value of air temperature measured with a predetermined value to detect an over temperature condition, and controlling at least one of the plurality of devices to operate in a reduced power mode upon detection of the over temperature condition. The predetermined percentage of maximum power can be 100 percent.

Yet another aspect of the present invention is directed to a system for monitoring and controlling a power distribution system that has a plurality of circuit branches for providing power to a plurality of devices. The system includes means for controlling each of the plurality of devices to operate at a predetermined percentage of maximum power, and means for detecting a value of a characteristic of power provided to each of the plurality of circuit branches.

The system can further include means for comparing a total value of the characteristic with a predefined value to detect an overload condition. The system can further include means for interrupting power to at least one of the plurality of devices when an overload condition is detected. The characteristic can be electrical current. The power distribution system can include at least one uninterruptible power supply, and the system can further include means for detecting that the uninterruptible power supply is in a battery mode of operation, and means for adjusting the predefined value when the uninterruptible power supply is in the battery mode of operation. The system can further include means for detecting air temperature values in a facility containing the power distribution system. The system can further include means for comparing the detected air temperature values with predetermined temperature values, and means for interrupting power to at least one of the plurality of devices when the detected air temperature values exceed the predetermined temperature values. The predetermined percentage of power can be 100 percent.

BRIEF DESCRIPTION OF THE DRAWINGS

For a better understanding of the present invention, reference is made to the drawings which are incorporated herein by reference and in which.

DETAILED DESCRIPTION

Embodiments of the present invention that provide methods and systems for monitoring and controlling power distribution in data centers will now be described. As understood by those skilled in the art, embodiments of the present invention are not limited for use in data centers, but may also be used in other facilities in which it is desired to monitor and control power distribution. Further, embodiments of the present invention may also be used aboard ships, airplanes or other mobile platforms where it is desired to monitor and control power distribution.

Figure 1:
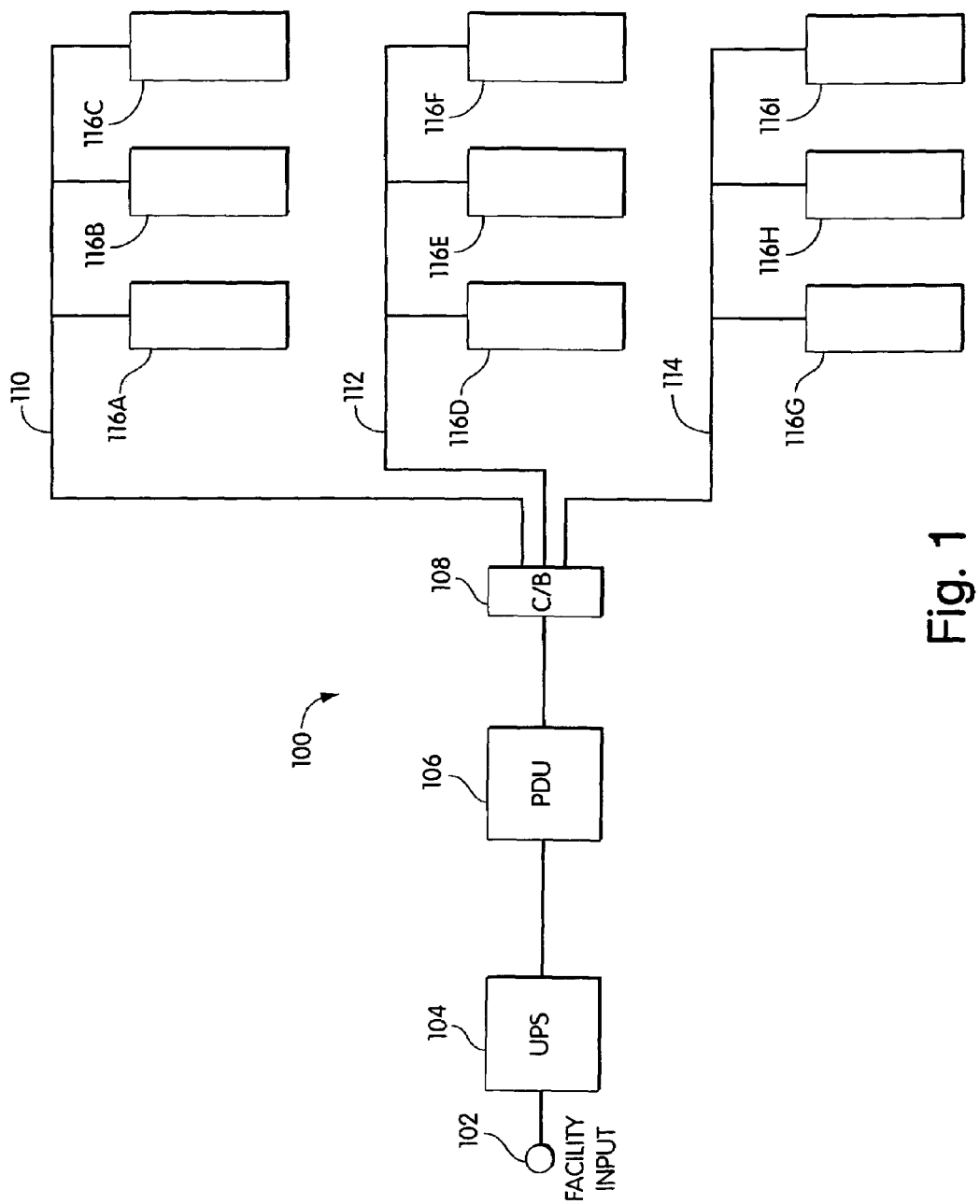
FIG. 1 shows a typical layout of the power distribution system in a data center.

FIG. 1 provides a diagram of a typical power distribution system 100 for a data center. The power distribution system 100 includes a facility input power port 102, an uninterruptible power supply (UPS) 104, a power distribution unit (PDU) 106, a 108, and three power distribution branches 110, 112 and 114. In FIG. 1, the power distribution system is used to power nine loads 116a–116i. As is known to those skilled in the art, some of the components shown for the power distribution system are optional. For example, the UPS is an optional component that is used to provide power to the loads in the event of disruption of the facility power.

The PDU 106 may include a number of power devices such as switches, a transformer and may include circuit breakers in addition to or in place of circuit breakers contained in the circuit breaker panel 108. The circuit breaker panel 108 distributes power from the PDU to each of the three power distribution branches 110, 112 and 114, and provides circuit breaker protection for each of the power distribution branches. The power loads 116a–116i may be equipment racks containing multiple computers, standalone computers, standalone mass storage devices, or any other equipment that is typically found in a data center.

Figure 2:
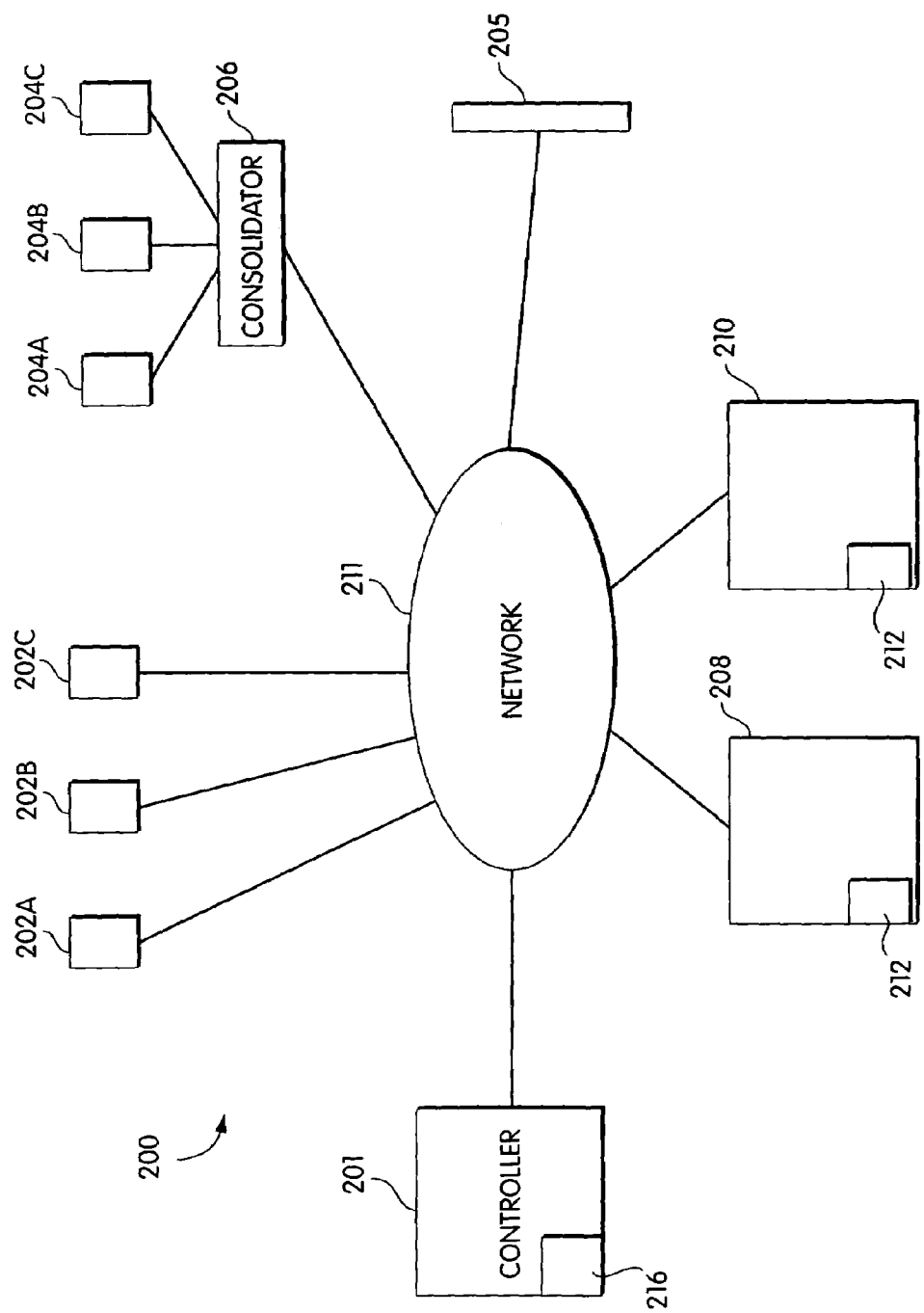
FIG. 2 shows a power distribution control system in accordance with a first embodiment of the present invention.

Embodiments of the present invention provide power monitoring and control for power distribution systems such as power distribution system 100. FIG. 2 provides a block diagram of a power monitoring and control system 200 of the present invention. The system includes a central controller 201, a first set of power monitoring devices 202A, 202B, and 202C, a second set of power monitoring devices 204A, 204B and 204C, an intelligent power strip 205, a consolidator 206, a first computer 208, a second computer 210, and a network 211 operatively coupling the components of the system 200.

With the exception of containing a power control module 212, the first computer and the second computer are standard computers that are typically found in a data center and may be functioning as servers, routers or in some other capacity, and may be mounted in racks of the data center. In different embodiments of the present invention, the power control module 212 is implemented using software, hardware, or a combination of software and hardware. In one embodiment the power control module is configured to respond to a signal received over the network 211 and control the computer in which it resides to consume maximum power by ensuring that all of the subsystems within the computer are operating at substantially 100%, all cooling systems are operating at 100%, and the computational load on all processors is at 100%. In other embodiments, the power can be controlled at a predetermined percentage of maximum power.

In some embodiments of the present invention, the power control module is designed to increase the power draw of a computer to maximum, without substantially interfering with tasks being performed by the computer. In particular, in one embodiment of the present invention, that will now be described, the power control module is configured to operate with computers that conserve power by utilizing an idle task (described in the background section above). For this embodiment, the power control module creates an additional task that is assigned a priority level lower than all other tasks being processed by the CPU, but higher than the idle task. The additional task is designed to fully utilize the CPU and all disk drives, memories and other devices within the computer for the entire idle time of the CPU to maximize power consumption by the computer. To ensure that the additional task has the appropriate priority, the control module may reconfigure the priorities of each of the other tasks. For computers that have multiple processing units, each of the processing units is configured to operate at maximum capacity. By operating as described above, the control module is able to cause a computer to operate at full, or near full power, without affecting the operation of tasks being performed by the computer. Further, in one particular embodiment, for use with computers that utilize ACPI or other similar means to control power draw of the computers, the power control module may be configured to control the speed of fans and the operation of other devices to operate at maximum power when desired.

Each of the power monitoring devices of the first set 202A, 202B and 202C and each of the power monitoring devices of the second set 204A, 204B, 204C are inline power monitoring devices that, in one embodiment, measure the current of a particular power feed. In other embodiments, the power monitoring devices may directly measure power. The power monitoring devices of the first set are intelligent devices that have internal network interface circuitry to enable the devices to communicate with other devices, such as the controller 201, over the network 211. The power monitoring devices of the second set have less intelligence than the devices of the first set and do not have the ability to communicate directly with the network 21 1. In one embodiment, the monitoring devices of the second set utilize point to point signaling such as RS-232 to communicate power levels to the consolidator 206. In other embodiments, the monitoring devices of the second set may utilize a network scheme or bus scheme like an RS-485 multi-drop bus, a power line carrier network, a Controller Area Network (CAN) bus, or a LONWORKS® twisted pair network, to communicate with the consolidator.

The consolidator 206 has multiple logical inputs to receive the signals from each of the power monitoring devices of the second set. In addition, the consolidator has a network interface to allow it to communicate with the network 211. In embodiments of the present invention, the consolidator receives data indicative of power levels measured by each of the power monitoring devices coupled to it and forwards these levels to the controller 201 over the network, along with identifying information for each of the devices. In one embodiment, the consolidator is a rack mounted device that may be mounted in one of the computer racks in a data center. In another embodiment, the consolidator may be implemented using a computer that also performs other functions in a data center or other facility.

The intelligent power strip 205 is a power strip having multiple power outlets and current monitoring devices incorporated within it for determining the current draw of any one of the power outlets or the total current draw of all devices that are powered from the intelligent power strip. The intelligent power strip also includes network interface circuitry to allow the strip to communicate with the controller 201 over the network 211. In addition, the intelligent power strip can be commanded by the controller to interrupt power to any of the power outlets on the strip. In one embodiment, the intelligent power strip may be implemented using a Masterswitch VM® power strip, available from American Power Corporation of West Kingston RI, that has the capability of measuring total current drawn by devices powered through the device and the capability to control the application of power to individual outlets.

In embodiments of the present invention, the controller 201 functions as the central controller for the system and communicates with other components of the system over the network 211. In one embodiment, the controller 201 includes a power load monitoring and control module 216 that communicates with the other components of the system to control the other components and receive power draw levels or current draw values from the power monitoring devices. The controller may be implemented using a single computer contained in one of the racks of a data center, using a desktop computer, a dedicated purpose computing device, an embedded computing system, or the functionality of the controller may be distributed among several networked computers. The control module 216 may be implemented using software, hardware or a combination of software and hardware.

The network 211 provides the connectivity between the components of the system. In one embodiment, the network may be implemented using one of a number of well known network architectures such as an Ethernet network. The network 211 may also be used by the first computer 208 and the second computer 210 to communicate with other devices within a data center or to communicate with devices outside of the data center over, for example, the Internet.

Figure 3:
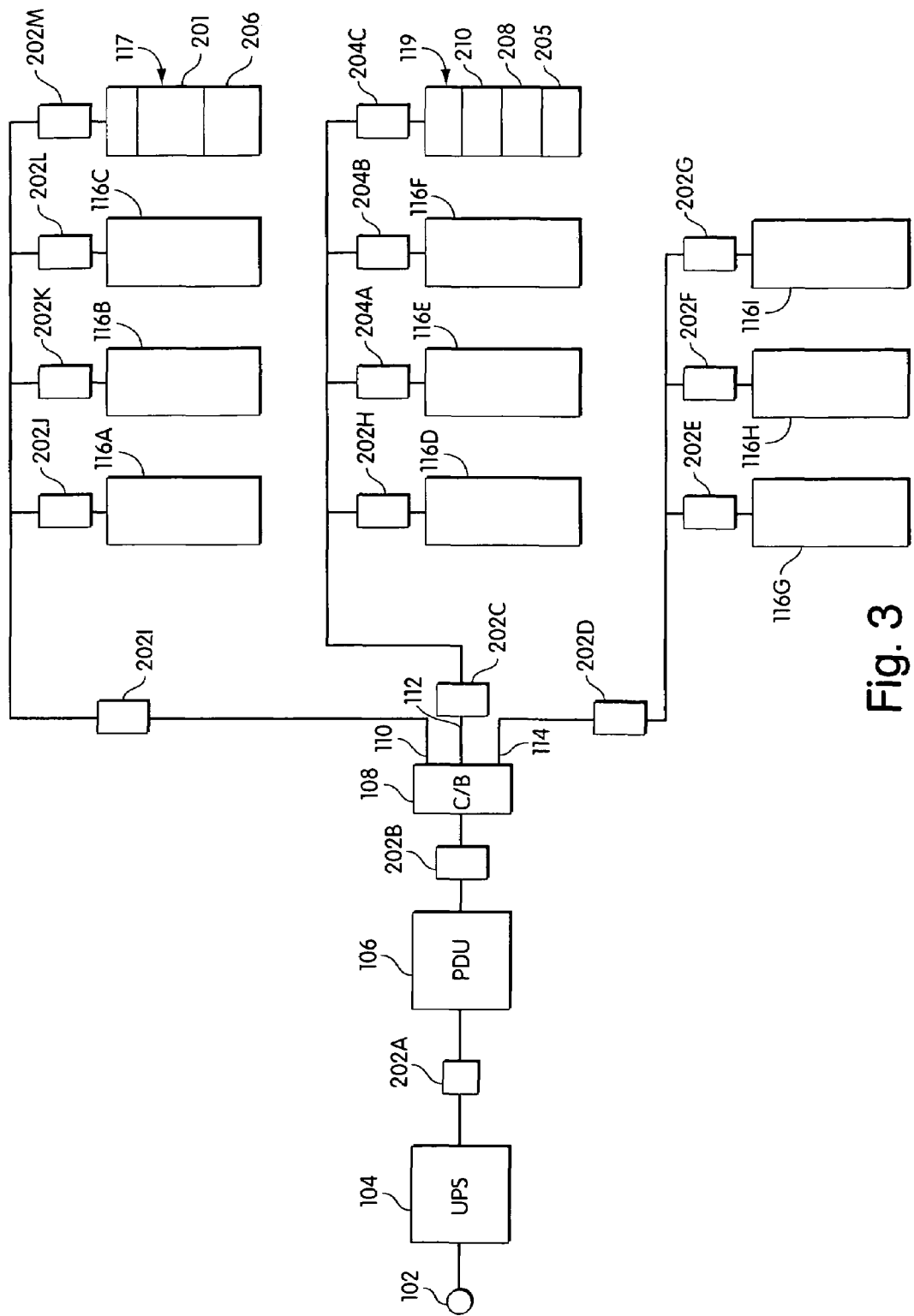
FIG. 3 shows the power distribution control system of FIG. 2 operatively coupled to the power distribution system of FIG. 1.

The system 200 of FIG. 2 may be implemented in the power distribution system of a data center as will now be described with reference to FIG. 3, which shows the system 200 of FIG. 2 implemented in the power distribution system 100 of FIG. 1. As shown in FIG. 3, a power monitoring device (202A–202M or 204A–204C) is incorporated at a number of places in the power distribution system 100. Two additional loads 117 and 119 are included in the system of FIG. 3. Load 117 is an equipment rack that contains the controller 201 and the consolidator 206, however, as understood by those skilled in the art, the controller and consolidator could be located in separate racks or need not be installed in a rack at all. Load 119 is also an equipment rack containing the first computer 208, the second computer 210 and the intelligent power strip 205. The diagram of FIG. 3 shows only the power connections between the components.

The signal connections between the components of the power monitoring system are as shown in FIG. 2. In the embodiment shown, the controller 201 is powered from the power distribution system that the controller is monitoring and controlling. In other embodiments, the controller may be powered by a separate power distribution system.

In the embodiment of the present invention shown in FIG. 3, a power distribution device is placed to measure the current drawn by each computer or server, by each rack, and on each branch circuit at the output of the circuit breaker panel. Additional power monitoring devices could be added at other points in the power distribution system, or if less monitoring is desired, fewer power monitoring devices could be used. In one embodiment, each of the power monitoring devices may be defined as having an order value with respect to a given point in the power distribution system. The order value for a given power monitoring device is determined based on the number of power monitoring devices that are in the power distribution system between the given device and the given point. For example, with reference to FIG. 3, for circuit branch 112 and with the circuit breaker panel 108 as the reference point, power, monitoring device 202C has an order of one, and power monitoring devices 202H, 204A, 204B and 204C have an order of two, and each of the power monitoring devices in the intelligent power strip 205 has an order of three.

Methods of controlling and monitoring the power and/or current in power distribution systems using the systems described above will now be described with reference to FIG. 4. However, methods of the present invention are not limited for use with the above-described systems, but may be used with other systems as well.

Figure 4:
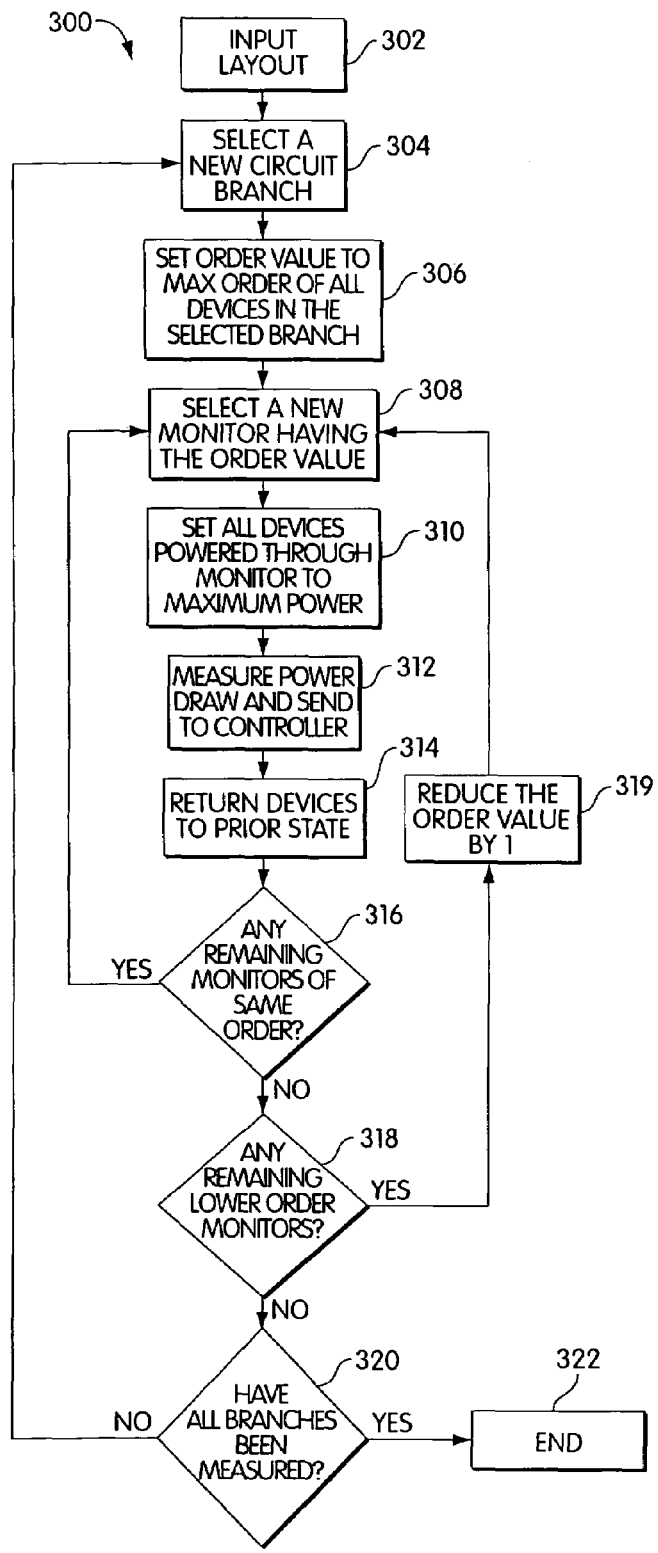
FIG. 4 shows a flow chart of a method of controlling power flow in a power distribution system in accordance with one embodiment of the present invention.

In one embodiment of a method 300 of the present invention, which is summarized in flowchart form in FIG. 4, the method determines the maximum current draw for each of the circuit branches of a power distribution system. The maximum current draw can be compared to predetermined values that are based, for example on circuit breaker values, and if a potential overload condition is detected, warnings can be generated and corrective actions can be taken. In a first step 302 of the method 300, the layout of the power distribution system is entered into the controller and a reference point is chosen. In one embodiment, the power monitoring and control module includes a program for enabling a user to enter the layout through a graphical user interface (GUI). In other embodiments, the power monitoring and control module is capable of receiving a data file containing the layout created using one of a number of computer aided design programs such as, for example, Visio®, Autocad® or a custom designed program.

Once the layout has been entered and the reference point has been chosen, in step 304, one of the circuit branches of the power distribution system is selected for analysis. Next, in step 306, an order value is set equal to the highest order value of all power monitoring devices in the selected circuit branch. For example, if the chosen circuit branch is branch 110 (FIG. 3), then the order value is set to that of devices 202J, 202K, 202L and 202M. In step 308, one of the power monitoring devices having the set order value is chosen. In step 310 all equipment that is powered through the selected power monitoring device is controlled to draw maximum power either manually, or automatically over the network 212 by the controller 201. Once all of the equipment is drawing maximum power, the selected power monitoring device communicates a value of power draw or current measured to the controller 201 in step 312. Next, in step 314, the equipment coupled to the selected power monitoring device is returned to its prior state.

In step 316 of method 300, a determination is made as to whether there are any other power monitoring devices in the selected circuit branch of the selected order that have not yet been selected. If the outcome of step 316 is YES, then another power monitoring device of the same order is selected, and steps 308 to 314 are repeated. For circuit branch 110, there are a total of four monitors having the highest order for the branch, and therefore, steps 308 to 314 will be repeated four times until the outcome of step 316 is "NO".

If the outcome of step 316 is NO, then in step 318 a determination is made as to whether there are any devices having an order value less than the selected device. If the outcome of step 318 is YES, then the set order value is reduced by 1 in step 319, a device having the next highest order value is selected, and steps 308 to 316 are repeated. If the outcome of step 318 is NO, then a determination is made at step 320 as to whether all branches have been measured. If all branches have been measured, then the process ends at 322. If all branches have not been measured, then steps 304 to 318 are repeated for another branch.

Once all of the maximum current draw values have been determined, the total maximum current draw can be compared to predetermined values to determine whether any corrective action should be taken. Additionally, the maximum current draw at each component or element (i.e., a circuit breaker, fuse or other device) having a maximum current rating can be compared to the current rating to determine if it is necessary to take any corrective actions. Corrective actions may include adding a branch circuit, moving equipment from one branch circuit to another branch circuit, or one of a number of other actions. In a system in which a UPS is used, the corrective action may include adding an additional UPS to a branch or adding additional capacity to an existing UPS.

In the method described above, the power draw on circuit branches is measured successively. In another embodiment, power draw may be measured on multiple circuit branches simultaneously. In this embodiment, the duration of maximum power for devices may be kept at a minimum to reduce the likelihood of tripping a circuit breaker serving two or more circuit branches that are measured simultaneously. As is well known, a typical circuit breaker will not trip instantly when the current exceeds the breaker's threshold, but typically will only trip when the excess current is maintained for some period of time.

In method 300 described above, the power draw is successively measured at power monitoring devices of lower order. In one embodiment of the present invention, prior to maximizing the power draw of all equipment powered through a particular branch circuit having a power monitoring device, the total power draw determined using all higher order power monitoring devices in the same branch is determined. The total is then compared with known allowable maximum levels for all lower order devices to ensure that the simultaneous powering of all higher order equipment at maximum levels will not cause power draw levels in excess of safe, allowed maximum values. If it is determined that the simultaneous powering may cause levels to be above allowed maximum values, then one of the corrective actions described below may be taken.

In embodiments of the present invention, one power monitor may be positioned to measure the power drawn by a plurality of devices without a higher order power monitor installed between the power monitor and any of the devices. In such a situation it may be undesirable to simultaneously bring all the devices to maximum power to measure the maximum power draw. In one embodiment, the devices are operated at maximum power one at a time with the other devices powered off to obtain the power draw for each device, and then the individual power draws are totaled to obtain the maximum at the power monitor. However, in some instances one or more of the devices may be running a critical application that is intended to be run 24 hours per day, seven days per week, without interruption. In such a situation, in one embodiment of the present invention, the maximum power draw for the combined devices is determined as follows, using an example of a situation where one power monitor is coupled to measure the power draw of three devices.

First, an ambient power measurement is made of the power or current drawn by the combination of the three devices as presently configured and operating. Next, a first one of the three devices is individually controlled to operate at maximum power while the other two (the second and third devices) continue to operate at their present state, and another power or current measurement is made. Then, the first device is returned to its normal operating state and another ambient power measurement is made of the combined power or current draw from the combination. If the ambient power measurement is substantially the same before and after the first device was configured to operate at maximum power, then an assumption is made that the power or current draw of the second and third devices remained substantially constant during the time that the first device was configured to draw full power. The increase in power or current draw over the ambient value contributed by configuring the first device to operate at maximum power is then determined by subtracting either ambient value from the value measured with the first device operating at full power.

The increase power over the ambient value for maximum power draw for the second and third devices can be determined in the same manner as the first device described above. Then the total maximum power can be determined by adding the increase for each of the three devices to the ambient value. In situations where the ambient value does not stay substantially constant before and after increasing the power draw of one of the other devices, then in one embodiment of the present invention, the procedure is repeated a number of times, and if the ambient value still does not stay constant, then the ambient value which produces the greatest increase is used. The increase for each of the three can then be added to the worst case ambient value. If the resulting value is within acceptable limits, all three devices may then be controlled to operate at maximum power draw, and an actual measurement with all three devices at maximum power can be made. If it is determined that the simultaneous powering may cause levels to above allowed maximum values, then one of the corrective actions described below may be taken.

The method 300 described above may be performed when equipment is first installed, when additional equipment is to be added to a system, or the method may be performed periodically as part of a scheduled maintenance program. In another embodiment of the present invention, the controller provides for constant monitoring of the power draw or current at each of the power monitoring devices to detect an actual or potential overload condition. Present values of power draw can be compared to predetermined limits that are calculated based on previously conducted measurements, circuit limitations, or other factors. Rather than performing constant monitoring, embodiments of the present invention also provide for periodic measurements or scheduled measurements.

When a potential overload condition is detected, one of a number of actions, or a combination of actions, may be initiated by the controller 201. These actions include sending notifications and logging problems as well as taking corrective actions. The notifications can include recording an event in a log and activating an audio or visual alarm. Further, the notifications may include sending an email to a system administrator or facility manager or paging the administrator or manager. Still further, in some embodiments, the controller may send a signal, such as an SNMP trap, to another computer to notify the other computer or its operator of the condition.

In addition, when a potential overload condition is detected, the controller may take positive steps to ensure that an overload will not occur. In one embodiment, the controller may initiate a shutdown command of one or more computers by communicating with the computers over the network, or the controller may command one or more computers to operate in a mode that draws less power. In other embodiments, the controller may also communicate with an intelligent power strip to command the power strip to interrupt power to one or more of its outlets. In still other embodiments, all or some of the power monitoring devices include a power interruption mechanism that can be activated by the controller over the network to interrupt equipment powered through the power monitoring device. By selectively powering off lower priority devices, the controller can ensure that power continues to be provided to computers that are running higher priority applications. Further, new devices may be prevented from being powered on by automatically switching off the power to outlet strips or individual outlets of outlet strips. After taking one of the above actions to prevent an overload, the controller can determine whether an overload potential has been avoided, and if not, can take further steps to reduce the power draw.

In one embodiment, to minimize power draw to avoid an overload, the controller can control a computer device to operate at less than maximum load by instructing the computer to exercise a low power task that utilizes CPU process time, but during that time, halts operation of the CPU. The low power task can be assigned a priority level higher than other tasks on the computer to ensure that sufficient low power time occurs. The average power load of the computer can be maintained at some fixed percentage using this method.

In one embodiment, the controller is coupled to the UPS 104 over the network to detect when the UPS has switched to battery mode. In response to detecting that the UPS is operating on battery, the controller measures the power draw at the power monitoring devices, and may take actions as described above to reduce the power draw to minimize the drain on the UPS to provide power longer for critical applications.

In some data centers, it is known to provide a dual power feed or some other multiple power feed to equipment. The multiple power feeds typically provide redundancy and/or accommodate relatively high power equipment that has multiple power feeds. To prevent overload when multiple feed power distribution systems are used, in one embodiment of the present invention, the measured maximum current of one feed is adjusted to account for an increase in current that will occur if one of the other feeds of the dual feed system fails. For example, in a dual feed system for a device, in which each of the feeds equally shares the current draw of the device, when determining if a potential overload condition exists, the controller multiplies the maximum current measured on one of the feeds by two to estimate the load on the feed upon failure of the other feed.

Figure 5:
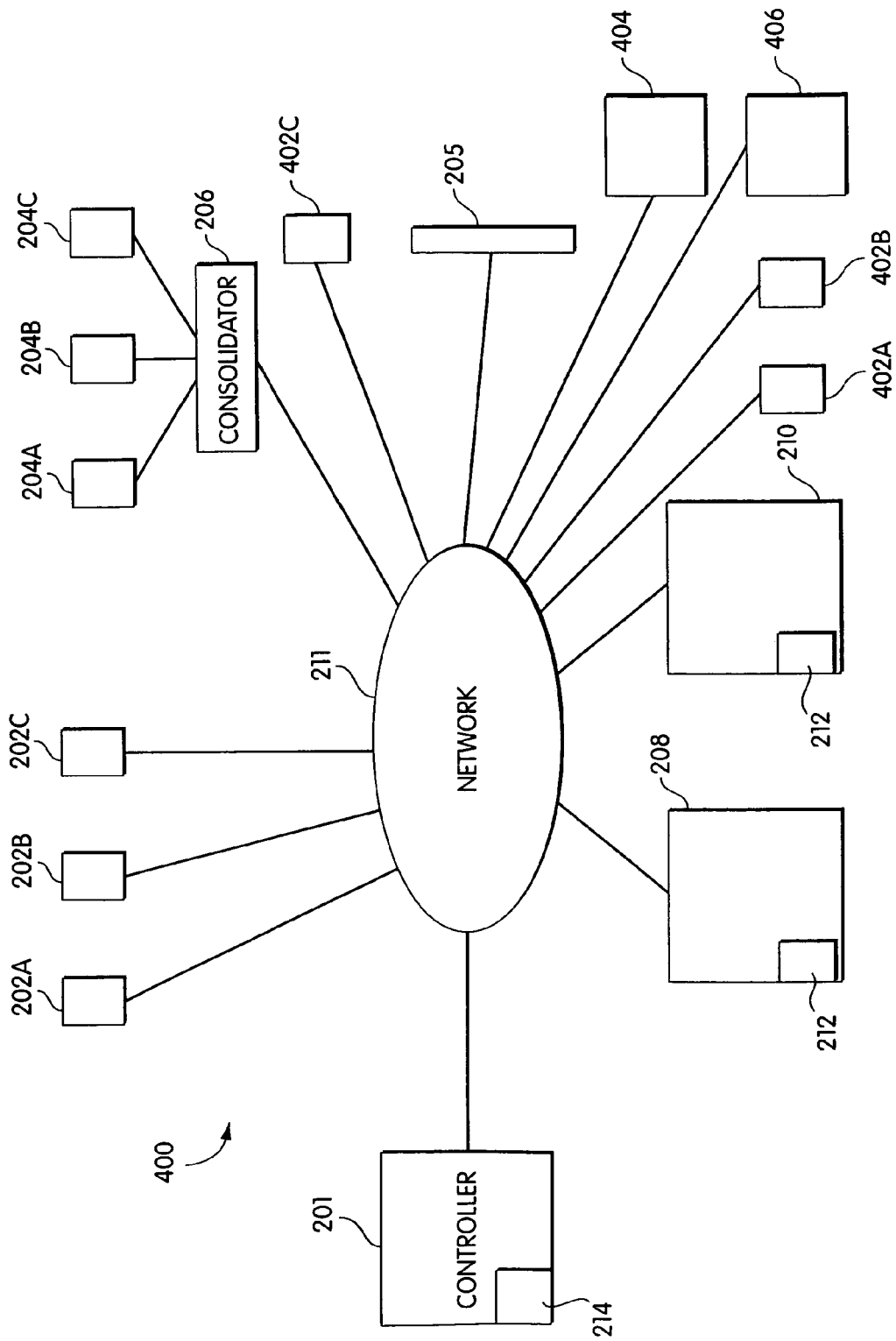
FIG. 5 shows a power distribution control system of a second embodiment of the present invention.

In another embodiment of the present invention, a system 400 monitors air temperature at various locations as well as provides the functions of the power distribution monitoring and control system 201. The system 400, as shown in FIG. 5, includes all of the components of system 200 plus additional sensors 402A and 402B for measuring air temperature in a facility. Sensors 402A and 402B are coupled to the controller to allow the controller to detect hot spots and take corrective action. Further two intelligent air conditioning systems 404 and 406 are also coupled to the controller 201 over the network 212, and may also be coupled directly to sensors 402A and 402B. The controller, in response to detecting potential or actual cooling problems can control the air conditioning systems to increase their outputs or redirect their outputs to prevent problems. In one embodiment, the loads are controlled to operate at maximum power for an extended period of time, while the air temperature is being monitored, to ensure that the air conditioning system is capable of supplying sufficient cool air for the maximum requirements. In other embodiments, more or less temperature controllers and air conditioning systems may be incorporated into the system 400.

In one embodiment, the system 400 may further include an additional sensor, identified as sensor 402C in FIG. 5, located outside of the facility to detect the outside temperature. As understood by those skilled in the art, the efficiency of many air conditioning systems is dependent on outside air temperature. When determining whether sufficient cooling is available from the air conditioning units, the controller can account for changes in efficiency of the air conditioning units caused by changes in the outside air temperature.

Figure 6:
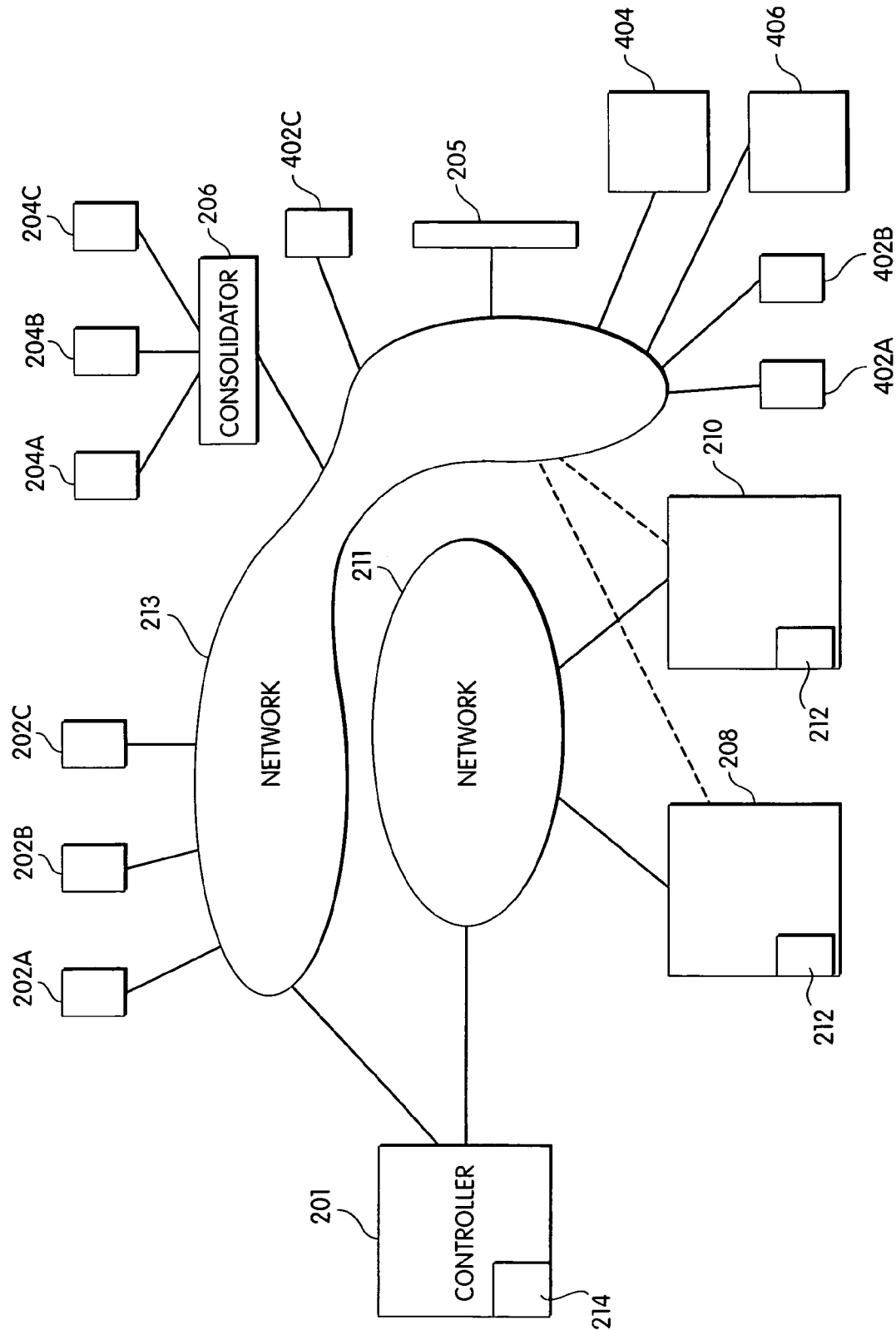
FIG. 6 shows a power distribution control system of a third embodiment of the present invention.

In another embodiment of the present invention, which will now be described with reference to FIG. 6, a power monitoring and control system 500 is provided. System 500 is similar to system 400, except that a second network 213 is provided. The second network 213 is used to provide communications between the power monitors of the system, the temperature sensors of the system and the controller 201. As shown in FIG. 6, the controller 201, each of the power monitoring devices of the first set 202A, 202B, and 202C, the consolidator 206, the intelligent power strip 205, temperature sensors 402A, 402B and 402C and air conditioning units 404 and 406 are all interconnected by the second network 213. Also, as indicated by the dotted lines in FIG. 6, in addition to being coupled to network 211, each of computers 208 and 210 may optionally be coupled to the second network 213 in addition to the first network 211. In different embodiments of the present invention, computers 208 and 210 can communicate with the controller 201 over the first network or the second network or over both the first network and the second network.

The second network may be implemented using one of a number of network types, such as an Ethernet network or a power line carrier network. In one embodiment, the second network is a private network that uses a modified version of the EIA-721 Common Application Standard (CAL) over WP in addition to SNMP and HTTP. The use of the second network provides several advantages. First, in embodiments of the present invention, the number of devices coupled to the second network is relatively low, and the amount of data to be transmitted over the network is anticipated to be relatively low. Accordingly, the software and hardware required in each of the devices to communicate over the second network is not overly complex or expensive to implement. Second, the traffic on the second network is kept separate from the traffic on the first network, and therefore, the traffic on the second network will not utilize bandwidth on the first network. In addition, the traffic on the second network is secure from users of the first network. This security becomes particularly important for applications in which the first network is coupled to the Internet and/or critical applications are operating in the computer devices of the network. Another advantage to the use of the second network is that address space on the first network is not occupied by the devices coupled to the second network.

In above-described embodiments, external power monitoring devices are used to monitor the power to computers or groups of computers. In another embodiment, some or all of the computers may have power monitoring devices contained within, allowing the computers to monitor their own power, and directly report their power draw to the controller over the network 211.

Embodiments of the present invention described above are for use with AC power distribution systems. However, the present invention is not limited for use with AC power distribution systems but also may be used with DC power distribution systems. In addition, embodiments of the present invention may be used in data centers that utilize both AC and DC power distribution systems. As understood by those skilled in the art, when used with a DC system, several components of the AC embodiments described above may not be needed, such as a power distribution unit containing a transformer.

Embodiments of the present invention described above, overcome problems associated with designing and maintaining power distribution systems in data centers by providing more accurate monitoring and controlling capabilities of the power draw of computer systems coupled to a power distribution system. In embodiments of the present invention described above, computer systems are controlled to operate at 100% of their maximum power to calculate the maximum power draw on circuit branches. As understood by those skilled in the art, in other embodiments, computers could be controlled to operate at known percentages of full load (i.e., 50% of full load and 75% of full load) and scaling factors could be used to extrapolate full load values based on measurements at known operating points. Such a system is advantageous in that it may be safer to first operate a device at a known value less than full power to determine if any problems may occur at full power before operating the device at full power.

In embodiments of the present invention described herein, current monitors are used to measure the current drawn by a given device or a group of devices to determine whether maximum current or power values may be exceeded in a system. As understood by those skilled in the art, the power drawn by a device is related to the current drawn by that device, and embodiments of the present invention are not limited to systems that utilize current monitors, but rather, also include systems that utilize monitors based on power and/or other electrical characteristics.

In embodiments of the present invention discussed above, an additional task having low priority is added to a task list of a computer to cause the computer to operate at maximum power. In other embodiments of the present invention, a task having a high priority may be added to cause a computer to operate at a predetermined percentage of maximum power. The task that is added may cause the processor to be idle or to operate at maximum capacity depending on whether it is desired to operate at a low or high percentage of maximum power. For example, in one embodiment, a computer can be controlled to operate at a minimum (or ambient) level by causing the processor to be idle for nearly 100% of the processor time by using a task that has a high priority, requires maximum processor time, and places the processor in an idle state. By causing a computer to operate at the ambient level and then the maximum level, the power consumption dynamic range of a computer can be determined. This dynamic range may be used by power distribution system designers in designing facilities.

Embodiments of the present invention are described above as being implemented with rack mounted computers. As known by those skilled in the art, in some data centers, computer servers are implemented as single cards, identified as server blades, installed within a common card cage or chassis, which is in turn typically installed in a rack. Embodiments of the present invention may also be used with server blades to individually control the power draw of each server blade and to control the combined power draw of two or more server blades installed in a common chassis.

In some embodiments of the present invention, as described above, the control modules 212 in the computers 208 and 210 are described as being implemented by software or a combination of hardware and software. In one embodiment, the control module is implemented as software that is packaged and installed with UPS management software.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of controlling operation of a computer comprising:
   receiving a power control input signal within the computer;
   determining a predetermined percentage of maximum power from the input signal; and
   controlling the computer to operate at substantially the predetermined percentage of maximum power by controlling at least one processor in the computer to perform an additional task adapted to cause the computer to operate at the predetermined percentage of maximum power.

2. The method of claim 1, wherein the predetermined percentage is 100 percent.

3. The method of claim 2, wherein controlling the computer to operate at substantially the predetermined percentage of maximum power includes controlling subsystems within the computer to operate at a maximum power level.

4. The method of claim 3, further comprising:
   controlling the computer to return to an original power state.

5. The method of claim 1, wherein the computer is configured to perform an idle task having a priority level, and wherein the additional task is assigned a priority level higher than the priority level of the idle task.

6. The method of claim 5, wherein the processor is configured to perform other tasks, each of which has a priority level, and wherein the priority level of the additional task is lower than the priority level of each of the other tasks.

7. The method of claim 1, further comprising:
controlling the computer to return to an original power state.

8. The method of claim 1, wherein the processor is configured to perform other tasks, each of which has a priority level, and wherein the priority level of the additional task is lower than the priority level of each of the other tasks.

9. A computer system comprising:
an input to receive a power control input signal; and
a control module configured to:
determine a predetermined percentage of maximum power from the power control input signal; and
control the computer system to operate at substantially the predetermined percentage of maximum power, wherein control the computer system includes controlling at least one processor in the computer system to perform an additional task adapted to cause the computer system to operate at the predetermined percentage of maximum power.

10. The computer system of claim 9, wherein the predetermined percentage is 100 percent.

11. The computer system of claim 10, wherein the control module is configured to control subsystems within the computer system to operate at a maximum power level.

12. The computer system of claim 11, wherein the control module is further configured to control the computer system to return to an original power state.

13. The computer system of claim 9, wherein the computer system is configured to perform an idle task having a priority level, and wherein the additional task is assigned a priority level higher than the priority level of the idle task.

14. The computer system of claim 13, wherein the processor is configured to perform other tasks, each of which has a priority level, and wherein the priority level of the additional task is lower than the priority level of each of the other tasks.

15. The computer system of claim 9, wherein the processor is configured to perform other tasks, each of which has a priority level, and wherein the priority level of the additional task is lower than the priority level of each of the other tasks.

16. A method for monitoring and controlling a power distribution system for providing power to a plurality of computer devices, the method comprising:
controlling a first computer device to operate at a first controlled power level;
detecting a first value of power provided to the first computer device;
controlling a second computer device to operate at a second controlled power level;
detecting a second value of power provided to the second computer device; and
based on the first value and the second value, controlling at least one of the first computer device and the second computer device to operate at a third controlled power level.

17. The method of claim 16, wherein the third controlled power level is less than the first controlled power level and less than the second controlled power level.

18. The method of claim 16, wherein the first controlled power level is a maximum power level of the first computer device and the second controlled power level is a maximum power level of the second computer device.

19. The method of claim 16, wherein the power distribution system includes an uninterruptible power supply, and wherein the method further includes:
detecting when the uninterruptible power supply is operating in battery mode; and
controlling at least one of the plurality of devices to operate in a reduced power mode upon detection of the battery mode.

20. The method of claim 16, further comprising:
controlling a third computer device to operate at a fourth controlled power level;
detecting a third value of power provided to the third computer device;
controlling a fourth computer device to operate at a fifth controlled power level; and
based on the third value and the fourth value, controlling one of the third computer device and the fourth computer device to operate at a fifth controlled power level.

* * * * *